(12) United States Patent
McCoy

(10) Patent No.: US 7,623,599 B2
(45) Date of Patent: Nov. 24, 2009

(54) BLIND BANDWIDTH DETECTION FOR A SAMPLE STREAM

(75) Inventor: James W. McCoy, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 425 days.

(21) Appl. No.: 11/284,675

(22) Filed: Nov. 21, 2005

(65) Prior Publication Data
US 2007/0116137 A1 May 24, 2007

(51) Int. Cl.
*H03D 1/00* (2006.01)
(52) U.S. Cl. .................................. 375/343
(58) Field of Classification Search ............. 375/142, 375/143, 150, 152, 260, 343; 342/108, 145, 342/189, 378; 708/5, 422, 813
See application file for complete search history.

(56) References Cited

U.S. PATENT DOCUMENTS

| | | | |
|---|---|---|---|
| 5,463,716 A | 10/1995 | Taguchi | |
| 6,650,616 B2 | 11/2003 | Crawford | |
| 7,136,432 B2 | 11/2006 | Min et al. | |
| 7,206,350 B2 * | 4/2007 | Korobkov et al. | 375/260 |
| 2003/0012302 A1 | 1/2003 | Webster et al. | |
| 2003/0067999 A1 | 4/2003 | Echavarri et al. | |
| 2003/0112743 A1 | 6/2003 | You et al. | |
| 2004/0052319 A1 | 3/2004 | Wakamatsu | |
| 2005/0008067 A1 | 1/2005 | Lewis | |
| 2005/0008088 A1 | 1/2005 | Liu et al. | |
| 2005/0063298 A1 | 3/2005 | Ling et al. | |
| 2005/0105647 A1 | 5/2005 | Wilhelmsson et al. | |
| 2005/0125176 A1 | 6/2005 | Makhlouf et al. | |
| 2005/0152326 A1 | 7/2005 | Vijayan et al. | |
| 2005/0169408 A1 | 8/2005 | Kim | |
| 2006/0171493 A1 | 8/2006 | Kim et al. | |
| 2006/0239367 A1 | 10/2006 | Wilhelmsson et al. | |
| 2007/0019538 A1 | 1/2007 | Long et al. | |
| 2007/0066362 A1 | 3/2007 | Ma et al. | |
| 2007/0110174 A1 | 5/2007 | Glazko et al. | |

OTHER PUBLICATIONS 12.747 Lecture 6: Section 3: Sequence Analysis I: Uniform Series, Cross- and Auto-Correlation, and Fourier Transforms, File last modified Oct. 4, 1996, www.whoi.edu.
Convolution and Correlation, Updated Jul. 2, 1999, Department of Computer Science, University of Copenhagen, www.diku.dk.

* cited by examiner

*Primary Examiner*—Sam K Ahn
(74) *Attorney, Agent, or Firm*—Dillon & Yudell LLP

(57) ABSTRACT

A method for determining a bandwidth of a complex valued sample stream may include correlating a first portion of a preamble symbol of the complex valued sample stream with a second portion of the preamble symbol to generate a time autocorrelated portion. The method may further include transforming the time autocorrelated portion to generate a frequency diverse autocorrelated portion. The method may further include determining a first phase variance over a first region of the frequency diverse autocorrelated portion, wherein the first region has a first bandwidth. The method may further include determining a second phase variance over a second region of the frequency diverse autocorrelated portion, wherein the second region has a second bandwidth greater than the first bandwidth. The method may further include determining the bandwidth of the complex valued sample stream by comparing the first phase variance with the second phase variance.

20 Claims, 3 Drawing Sheets

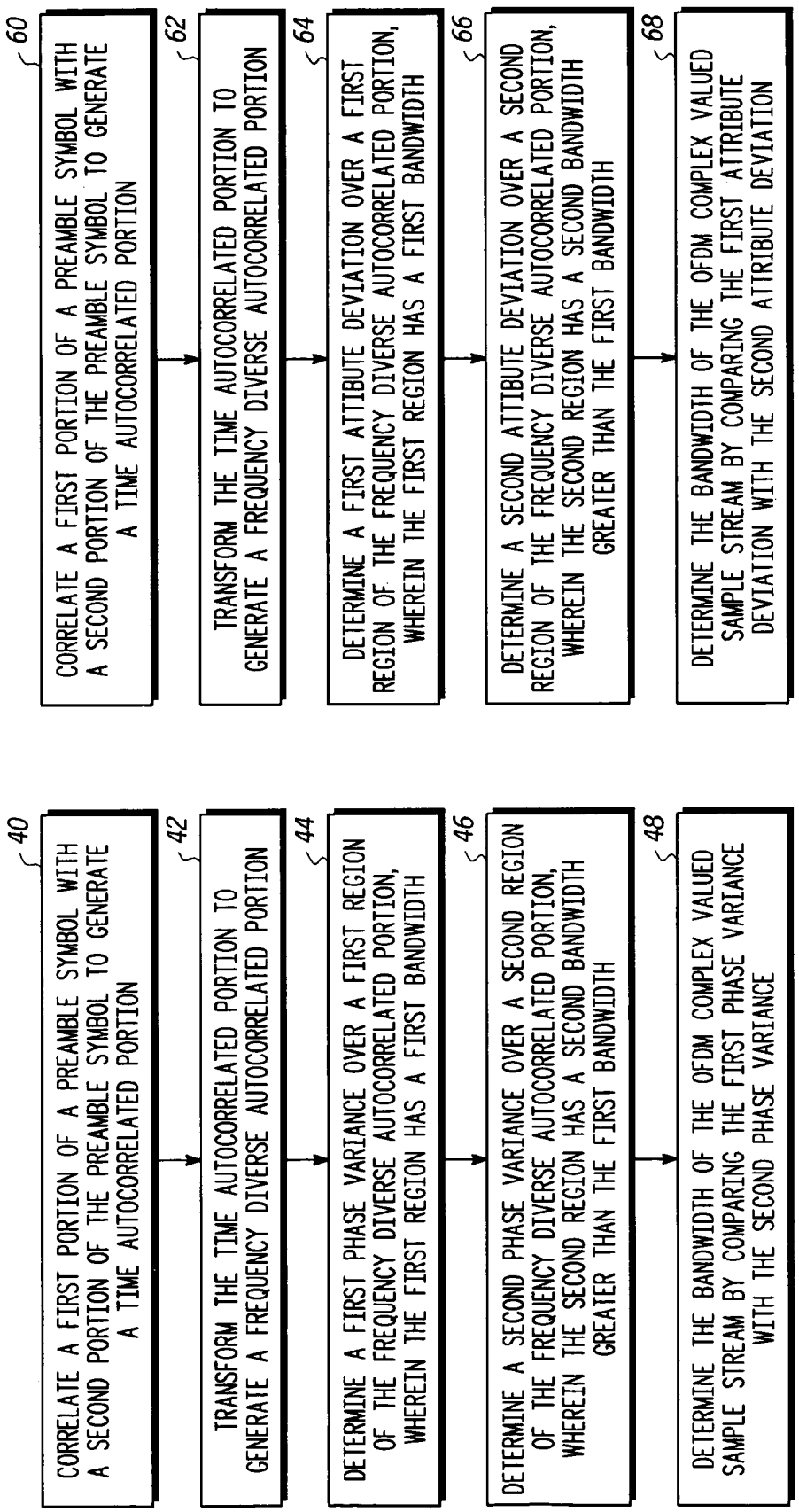

BLIND BANDWIDTH DETECTION FOR A SAMPLE STREAM

FIELD OF THE INVENTION

The present invention relates generally to communication methods and systems, and more particularly to blind bandwidth detection for a sample stream.

RELATED ART

Traditionally, in an OFDM receiver, bandwidth detection for a complex valued sample stream has been performed by using supervised techniques. Such supervised techniques require the knowledge of the pattern of the complex valued sample stream. Accordingly, these techniques do not work in an environment where there may be a large number of possible patterns of the complex valued sample stream. This is because it becomes computationally difficult to process the large number of possible patterns of the complex valued sample stream.

Thus, there is a need for methods and systems for blind bandwidth detection in a complex valued sample stream, which are blind and thus do not require the processing of large number of patterns of the complex valued sample stream.

BRIEF DESCRIPTION OF THE DRAWINGS

The present invention is illustrated by way of example and not limited by the accompanying figures, in which like references indicate similar elements, and in which:

FIG. 4 is a flow chart for an exemplary method for determining a bandwidth of a complex valued sample stream, consistent with one embodiment of the invention; and FIG. 5 is a flow chart for an exemplary method for determining a bandwidth of a complex valued sample stream, consistent with one embodiment of the invention.

Figure 1:
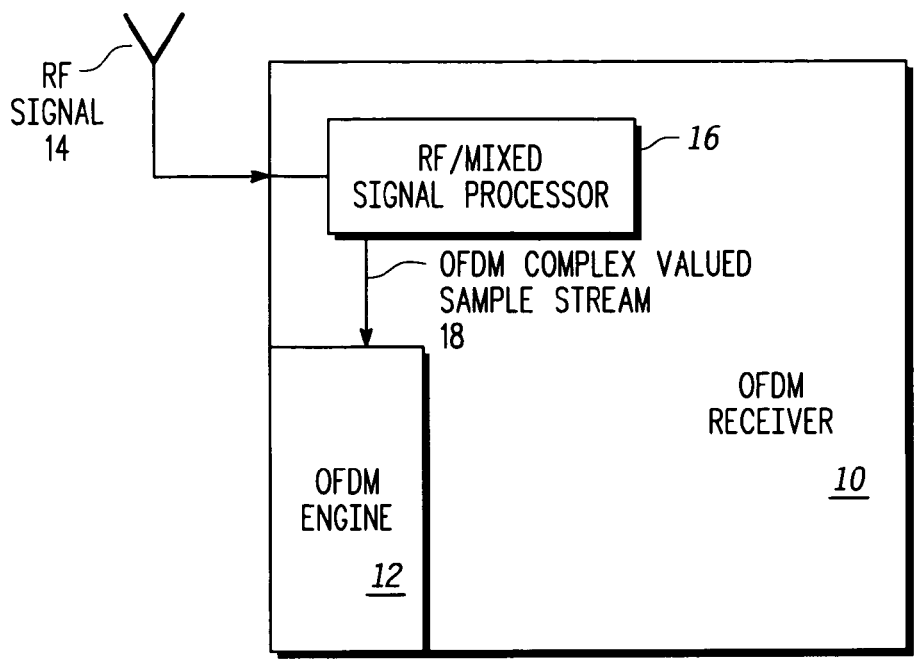
FIG. 1 is a block diagram of an exemplary OFDM receiver, consistent with one embodiment of the invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE EMBODIMENTS

In one aspect, a method for determining a bandwidth of a complex valued sample stream is provided. The exemplary method may include correlating a first portion of a preamble symbol of the complex valued sample stream with a second portion of the preamble symbol to generate a time autocorrelated portion. The exemplary method may further include transforming the time autocorrelated portion to generate a frequency diverse autocorrelated portion. The exemplary method may further include determining a first phase variance over a first region of the frequency diverse autocorrelated portion, wherein the first region has a first bandwidth. The exemplary method may further include determining a second phase variance over a second region of the frequency diverse autocorrelated portion, wherein the second region has a second bandwidth greater than the first bandwidth. The exemplary method may further include determining the bandwidth of the complex valued sample stream by comparing the first phase variance with the second phase variance.

In another aspect, a method for a method for determining a bandwidth of a complex valued sample stream is provided. The exemplary method may include correlating a first portion of a preamble symbol of the complex valued sample stream with a second portion of the preamble symbol to generate a time autocorrelated portion. The exemplary method may further include transforming the time autocorrelated portion to generate a frequency diverse autocorrelated portion. The exemplary method may further include determining a first attribute deviation over a first region of the frequency diverse autocorrelated portion, wherein the first region has a first bandwidth. The exemplary method may further include determining a second attribute deviation over a second region of the frequency diverse autocorrelated portion, wherein the second region has a second bandwidth greater than the first bandwidth. The exemplary method may further include determining the bandwidth of the complex valued sample stream by comparing the first attribute deviation with the second attribute deviation.

In yet another aspect, an orthogonal frequency division multiplexing (OFDM) receiver comprising an OFDM engine is provided. The OFDM engine may be configured to correlate a first portion of a preamble symbol of the OFDM complex valued sample stream with a second portion of the preamble symbol to generate a time autocorrelated portion. The OFDM engine may further be configured to transform the time autocorrelated portion to generate a frequency diverse autocorrelated portion. The OFDM engine may further be configured to determine a first attribute deviation over a first region of the frequency diverse autocorrelated portion, wherein the first region has a first bandwidth. The OFDM engine may further be configured to determine a second attribute deviation over a second region of the frequency diverse autocorrelated portion, wherein the second region has a second bandwidth greater than the first bandwidth. The OFDM engine may further be configured to determine the bandwidth of the OFDM complex valued sample stream by comparing the first attribute deviation with the second attribute deviation.

FIG. 1 is an exemplary block diagram of an OFDM receiver 10, consistent with one embodiment of the invention. OFDM receiver 10 may include, among other components, an OFDM engine 12 and a RF/mixed signal processor 16. By way of example, RF/mixed signal processor 16 may receive a RF signal 14 via an antenna. RF/mixed signal processor 16 may generate an OFDM complex valued sample stream 18. OFDM engine 12 may capture the OFDM complex valued sample stream 18 and process it further in accordance with the embodiments of the invention. OFDM receiver 10 may be implemented using any combination of hardware, software, and/or firmware. Although FIG. 1 shows only an OFDM engine 12 and a RF/mixed signal processor 16 as part of OFDM receiver 10, the OFDM receiver may include additional or fewer components.

Figure 2:
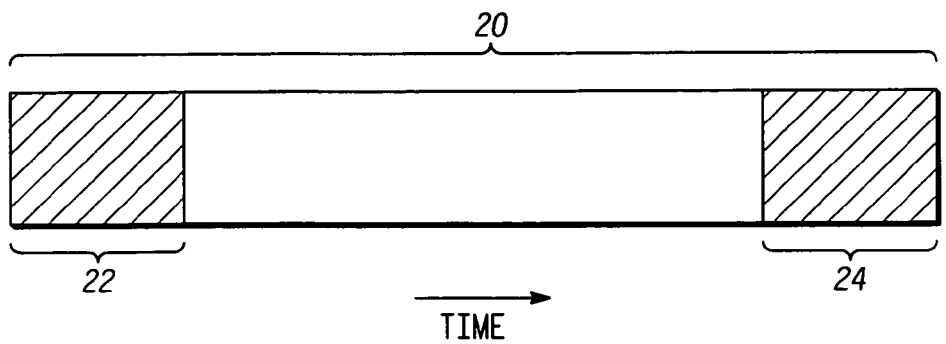
FIG. 2 is a drawing illustrating an exemplary preamble symbol, consistent with one embodiment of the invention.

FIG. 2 is a drawing illustrating an exemplary preamble symbol, consistent with one embodiment of the invention. Preamble symbol 20 may include a first portion, such as a cyclic prefix 22 at the beginning of preamble symbol 20 and a second portion 24 at the end, which may be used to generate cyclic prefix 22. As used herein, the term "preamble" is not limited to the header or the beginning part of a frame, such as an OFDM frame, instead it covers similar structures that may be in the middle, end, or any other part of the frame. Thus, preamble, as used herein may cover structures referred to as mid-amble or post-amble. In addition, the term "preamble" may mean any reference symbol, including a pilot symbol, in any frame.

Figure 3:
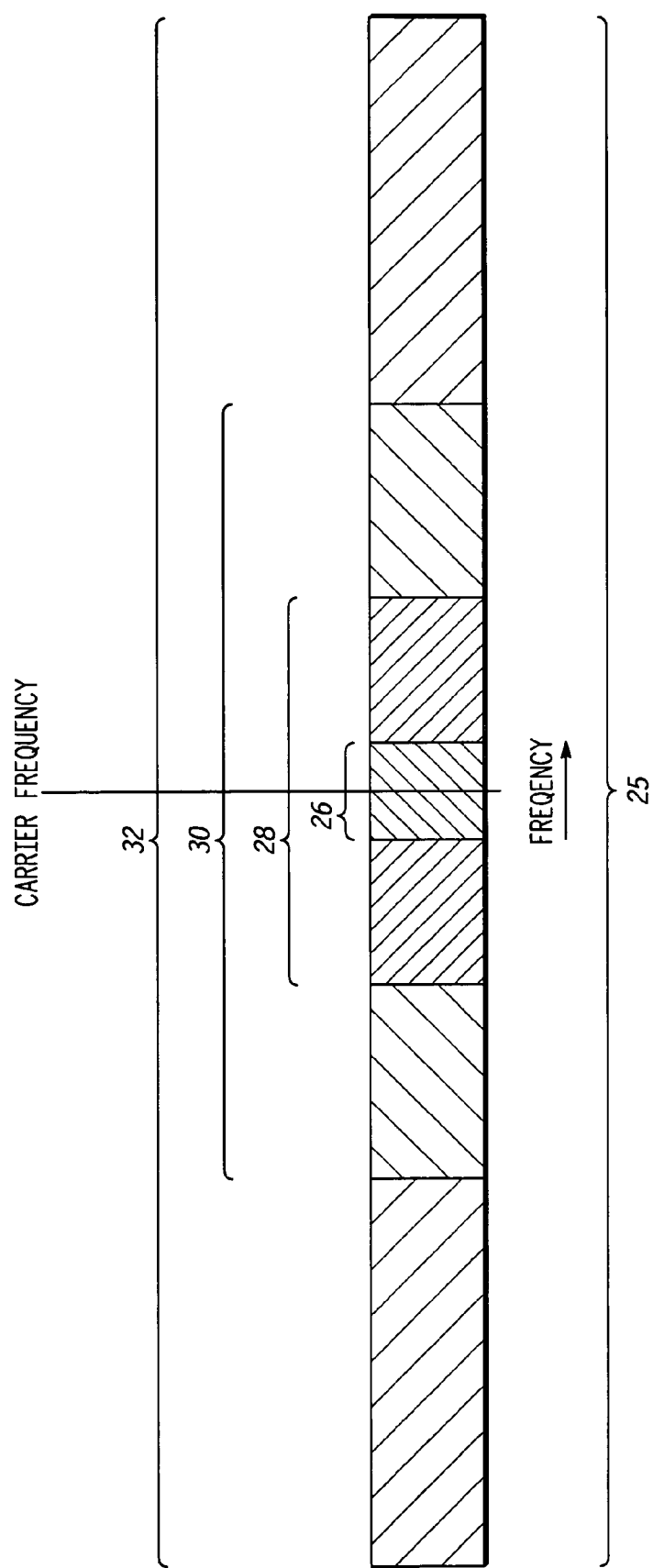
FIG. 3 is a diagram of an exemplary frequency diverse autocorrelated portion, consistent with one embodiment of the invention.

FIG. 3 is a diagram of a frequency diverse autocorrelated portion. By way of example, frequency diverse autocorrelated portion 25 may be generated by OFDM engine 12. OFDM engine 12 may correlate a first portion of a preamble symbol of an OFDM complex valued sample stream (for example, 22 of FIG. 2) with a second portion of the preamble symbol (for example, 24 of FIG. 2). As used herein, the term "complex valued sample stream" may include a real valued sample stream, an imaginary valued sample stream, or a combination thereof. The correlation step may generate a time autocorrelated portion, which then could be transformed to a frequency diverse autocorrelated portion by OFDM engine 12. By way of example, as part of this step, OFDM engine may perform a discrete fourier transform on the time autocorrelated portion. Frequency diverse autocorrelated portion 25 may include a first region 26. First region 26 may have a first bandwidth. By way of example, first bandwidth may be 1.25 MHz. Frequency diverse autocorrelated portion 25 may further include a second region 28, which may have a second bandwidth. By way of example, second bandwidth may be 5 MHz. Frequency diverse autocorrelated portion 25 may have a third region 30, which may have a third bandwidth. By way of example, third bandwidth may be 10 MHz. Frequency diverse autocorrelated portion may have a fourth region 32, which may have a fourth bandwidth. By way of example, fourth bandwidth may be 20 MHz. Although FIG. 3 shows only four regions, frequency diverse autocorrelated portion may have additional or fewer regions. Additionally, each of these regions may have a lower or a higher bandwidth value associated with it.

FIG. 4 is a flow chart for an exemplary method for determining a bandwidth of a complex valued sample stream, such as an OFDM complex valued sample stream, consistent with one embodiment of the invention. As part of the exemplary method, OFDM engine 12 may correlate a first portion of a preamble symbol (for example, 22 of FIG. 2) of the OFDM complex valued sample stream with a second portion of the preamble symbol (for example, 24 of FIG. 2) to generate a time autocorrelated portion (step 40). By way of example, the following equation may be used to generate the time autocorrelated portion:

$$Rrr(\Delta) = \sum_{n=max(1,-\Delta+1)}^{min(T_{ff}/8,T_{ff}/8-\Delta)} r(n)r*(n+\Delta+N_{ff})$$

where $f_\Delta$ is the frequency spacing between the OFDM sub-carriers;

$T_{ff}$ is approximately $1/f_\Delta$;

$f_s$ is the sampling rate of the OFDM complex valued sample stream;

$N_{ff}$ is equal to $T_{ff}*f_s$; and $\Delta$ is the incremental delay relative to $N_{ff}$.

Although the above equation uses certain constant values, these values may be different for different OFDM applications, such as Digital Audio Broadcasting, Digital Video Broadcasting, Integrated Services Digital Broadcasting, Wireless LAN (IEEE 802.11(a/g), HiperLAN/2, MMAC), Wireless MAN, and IEEE 802.20, or other OFDM applications, standards, and/or platforms. The above example corresponds to the IEEE 802.16(e) standard.

Next, OFDM engine 12 may transform the time autocorrelated portion to generate a frequency diverse autocorrelated portion (step 42). By way of example, the following equation may be used to generate the frequency diverse autocorrelated portion.

$$Srr(k) = \sum_{\Delta=\frac{-T_{ff}fs}{8}+1}^{\frac{T_{ff}fs}{8}-1} \left(\frac{T_{ff}fs}{8} - abs(\Delta)\right) e^{-j2\pi\Delta k/N_{ff}} * Rrr(\Delta)$$

where, k is a frequency index of the frequency diverse autocorrelated portion;

$T_{ff}$ is $1/f_\Delta$;

$f_s$ is the sampling rate of the OFDM complex valued sample stream;

$N_{ff}$ is equal to $T_{ff}*f_s$; and $\Delta$ is the incremental delay relative to $N_{ff}$.

Next, OFDM engine 12 may determine a first phase variance over a first region of the frequency diverse autocorrelated portion, wherein the first region has a first bandwidth (step 44). As part of this step, a histogram of a phase of the frequency diverse autocorrelated portion over the first region may be generated. By way of example, the histogram may be generated using the following equation:

$$f(b(n)) = hist(\angle S_{rr}(k))$$

where f(b(n)) is the histogram of samples of the angle of the frequency diverse autocorrelated portion over the first region; and b(n) are the bin centers of the histogram of the samples of the angle of the frequency diverse autocorrelated portion over the first region.

Next, as part of this step, the first phase variance over a first region of the frequency diverse autocorrelated portion may be computed. By way of example, the first phase variance over a first region of the frequency diverse autocorrelated portion may be computed using the following equation:

$$var1 = \frac{\sum_n b^2(n)f(b(n))}{\sum_n f(b(n))}$$

Next, OFDM engine 12 may determine a second phase variance over a second region of the frequency diverse autocorrelated portion, wherein the second region has a second bandwidth greater than the first bandwidth (step 46). As part of this step, a histogram of a phase of the frequency diverse autocorrelated portion over the second region may be generated. By way of example, the histogram may be generated using the following equation:

$$f(b(n)) = hist(\angle S_{rr}(k))$$

where f(b(n)) is the histogram of samples of the angle of the frequency diverse autocorrelated portion over the second region; and b(n) are the bin centers of the histogram of the samples of the angle of the frequency diverse autocorrelated portion over the second region.

As part of this step, the samples corresponding to first region (for example, 26 of FIG. 3) may be excluded. Next, as part of this step, the second phase variance over a second region of the frequency diverse autocorrelated portion may be computed. By way of example, the second phase variance over the second region of the frequency diverse autocorrelated portion may be computed using the following equation:

$$\text{var2} = \frac{\sum_n b^2(n)f(b(n))}{\sum_n f(b(n))}$$

Next, OFDM engine 12 may determine the bandwidth of the OFDM complex valued sample stream by comparing the first phase variance with the second phase variance (step 48). As part of this step, the second phase variance may be scaled and then compared with the first phase variance. Thus, by way of example, the following inequality may be used to compare the first phase variance with the second phase variance:

0.2*var2>var1.

Although this comparison step includes scaling the second phase variance down, the first phase variance may be scaled up as part of this step, as well. If as a result of this comparison, the first phase variance is determined to be lower than the scaled second phase variance, then the first bandwidth is determined to be the bandwidth of the OFDM complex valued sample stream. If, however, the first phase variance is determined to be higher than the scaled second phase variance, then the process continues.

Next, OFDM engine 12 may determine a third phase variance over a third region of the frequency diverse autocorrelated portion, wherein the third region has a third bandwidth greater than the second bandwidth. As part of this step, a histogram of a phase of the frequency diverse autocorrelated portion over the third region may be generated using an equation similar to the given above with respect to the generation of the histogram for the second region. As part of this step, the samples corresponding to the first region (for example, 26 of FIG. 3) and the second region (for example, 28 of FIG. 3) may be excluded. Next, as part of this step, the third phase variance over a third region of the frequency diverse autocorrelated portion may be computed. By way of example, the third phase variance over the third region of the frequency diverse autocorrelated portion may be computed using the following equation:

$$\text{var3} = \frac{\sum_n b^2(n)f(b(n))}{\sum_n f(b(n))}$$

Next, OFDM engine 12 may determine the bandwidth of the OFDM complex valued sample stream by comparing the second phase variance with the third phase variance in a manner similar to step 48. As part of this step, the third phase variance may be scaled and then compared with the second phase variance. Thus, by way of example, the following inequality may be used to compare the second phase variance with the third phase variance:

0.2*var3>var2.

Although this comparison step includes scaling the third phase variance down, the second phase variance may be scaled up as part of this step, as well. If as a result of this comparison, the second phase variance is determined to be lower than the scaled third phase variance, then the second bandwidth is determined to be the bandwidth of the OFDM complex valued sample stream. If, however, the second phase variance is determined to be higher than the scaled third phase variance, then the process continues. In particular, using similar steps, as discussed above with respect to comparing the first phase variance with the second phase variance and comparing the second phase variance with the third phase variance, the third variance may be compared with a fourth phase variance, if necessary. Indeed, phase variances related to additional regions may also be compared.

FIG. 5 is a flow chart for an exemplary method for determining a bandwidth of a complex valued sample stream, such as an OFDM complex valued sample stream, consistent with one embodiment of the invention. As part of the exemplary method, OFDM engine 12 may correlate a first portion of a preamble symbol of the OFDM complex valued sample stream with a second portion of the preamble symbol to generate a time autocorrelated portion (step 60). Next, OFDM engine 12 may transform the time autocorrelated portion to generate a frequency diverse autocorrelated portion (step 62). These two steps may be executed by OFDM engine 12 in a manner similar to described above with respect to the method described with respect to FIG. 4.

Next, OFDM engine 12 may determine a first attribute deviation over a first region of the frequency diverse autocorrelated portion, wherein the first region has a first bandwidth (step 64). As used herein the term "attribute deviation" includes any departure from a desired, expected, or mean value of an attribute relating to the frequency diverse autocorrelated portion. Exemplary attributes include, but are not limited to, phase, amplitude, or a complex value of the frequency diverse autocorrelated portion. When phase of the frequency diverse autocorrelated portion is used as the attribute, the steps discussed above with respect to FIG. 4 may be used to determine the first attribute deviation. When complex values of the samples of the frequency diverse autocorrelated portion are used as the attribute, the following exemplary equation may be used to first determine a mean complex value over the first region of the frequency diverse autocorrelated portion:

$$\overline{Srr} = \frac{1}{N}\sum_{n=1}^{N} Srr(n)$$

where, $\overline{Srr}$ is the mean complex value over the first region of the frequency diverse autocorrelated portion;

Srr(n) are the samples of the frequency diverse autocorrelated portion over the first region.

Next, OFDM engine 12 may determine a variance from the mean complex value using the following exemplary equation:

$$\sigma_s^2 = \frac{1}{N-1}\sum_{n=1}^{N} |S_{rr}(n) - \overline{S_{rr}}|^2$$

The variance from the mean complex value may represent the first attribute deviation over a first region of the frequency diverse autocorrelated portion, wherein the first region has a first bandwidth.

Next, OFDM engine 12 may determine a second attribute deviation over a second region of the frequency diverse autocorrelated portion, wherein the second region has a second bandwidth greater than the first bandwidth (step 66). By way of example, the above process used with respect to the first region may be used. The second region (for example, 28 of FIG. 3) may exclude samples corresponding to the first region (for example, 26 of FIG. 3).

Next, OFDM engine 12 may determine the bandwidth of the OFDM complex valued sample stream by comparing the first attribute deviation with the second attribute deviation (step 68). Either of the first attribute deviation and the second attribute deviation may be scaled as part of the comparison. If the first attribute deviation is determined to be lower than the scaled second attribute variation, then the first bandwidth is determined to be the bandwidth of the OFDM complex valued sample stream. If, however, the second attribute variation is determined to be higher than the scaled second attribute variation, then the process continues. In particular, using similar steps, as described above, a third attribute variation may be determined, which then may be compared to the second attribute variation. Additional attribute variations may be determined and relevant comparisons may be made, if necessary.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for determining a bandwidth of a complex valued sample stream, comprising:
   correlating a first portion of a preamble symbol of the complex valued sample stream with a second portion of the preamble symbol to generate a time autocorrelated portion;
   transforming the time autocorrelated portion to generate a frequency diverse autocorrelated portion;
   determining a first phase variance over a first region of the frequency diverse autocorrelated portion, wherein the first region has a first bandwidth;
   determining a second phase variance over a second region of the frequency diverse autocorrelated portion, wherein the second region has a second bandwidth greater than the first bandwidth; and
   determining the bandwidth of the complex valued sample stream by comparing the first phase variance with the second phase variance.

2. The method of claim 1, wherein determining the second phase variance includes excluding samples corresponding to the first region the frequency diverse auto correlated portion.

3. The method of claim 1, wherein comparing the first phase variance with the second phase variance includes scaling the second phase variance, and wherein the first bandwidth is determined as the bandwidth of the complex valued stream if the first phase variance is lower than a scaled second phase variance.

4. The method of claim 1 further comprising determining a third phase variance over a third region of the frequency diverse autocorrelated portion, wherein the third region has a third bandwidth greater than the second bandwidth.

5. The method of claim 4 further comprising determining the bandwidth of the complex valued sample stream by comparing the second phase variance with the third phase variance.

6. The method of claim 5 further comprising determining a fourth phase variance over a fourth region of the frequency diverse auto correlated portion, wherein the fourth region has a fourth bandwidth greater than the third bandwidth.

7. The method of claim 6 further comprising determining the bandwidth of the complex valued sample stream by comparing the third phase variance with the fourth phase variance.

8. A method for determining a bandwidth of a complex valued sample stream, comprising:
   correlating a first portion of a preamble symbol of the complex valued sample stream with a second portion of the preamble symbol to generate a time autocorrelated portion;
   transforming the time autocorrelated portion to generate a frequency diverse auto correlated portion;
   determining a first attribute deviation over a first region of the frequency diverse autocorrelated portion, wherein the first region has a first bandwidth;
   determining a second attribute deviation over a second region of the frequency diverse autocorrelated portion, wherein the second region has a second bandwidth greater than the first bandwidth; and
   determining the bandwidth of the complex valued sample stream by comparing the first attribute deviation with the second attribute deviation.

9. The method of claim 8, wherein determining the second attribute deviation includes excluding samples corresponding to the first region of the frequency diverse autocorrelated portion.

10. The method of claim 8, wherein comparing the first attribute deviation with the second attribute deviation includes scaling at least one of the first attribute deviation and the second attribute deviation.

11. The method of claim 8 further comprising determining a third attribute deviation over a third region of the frequency diverse auto correlated portion, wherein the third region has a third bandwidth greater than the second bandwidth.

12. The method of claim 11 further comprising determining the bandwidth of the complex valued sample stream by comparing the second attribute deviation with the third attribute deviation.

13. The method of claim 12 further comprising determining a fourth attribute deviation over a fourth region of the frequency diverse autocorrelated portion, wherein the fourth region has a fourth bandwidth greater than the third bandwidth.

14. The method of claim 13 further comprising determining the bandwidth of the complex valued sample stream by comparing the third attribute deviation with the fourth attribute deviation.

15. An orthogonal frequency division multiplexing (OFDM) receiver comprising:
   an OFDM engine, wherein the OFDM engine is configured structurally to correlate a first portion of a preamble symbol of the OFDM complex valued sample stream with a second portion of the preamble symbol to generate a time autocorrelated portion;

transform the time auto correlated portion to generate a frequency diverse autocorrelated portion;

determine a first attribute deviation over a first region of the frequency diverse autocorrelated portion, wherein the first region has a first bandwidth;

determine a second attribute deviation over a second region of the frequency diverse autocorrelated portion, wherein the second region has a second bandwidth greater than the first bandwidth; and determine the bandwidth of the OFDM complex valued sample stream by comparing the first attribute deviation with the second attribute deviation.

16. The OFDM receiver of claim 15, wherein the OFDM engine is configured to exclude samples corresponding to the first region of the frequency diverse autocorrelated portion while determining the second attribute deviation over the second region.

17. The OFDM receiver of claim 15, wherein the OFDM engine is configured to determine a third attribute deviation over a third region of the frequency diverse autocorrelated portion, wherein the third region has a third bandwidth greater than the second bandwidth.

18. The OFDM receiver of claim 17, wherein the OFDM engine is configured to determine the bandwidth of the OFDM complex valued sample stream by comparing the second attribute deviation with the third attribute deviation.

19. The OFDM receiver of claim 18, wherein the OFDM engine is configured to determine a fourth attribute deviation over a fourth region of the frequency diverse autocorrelated portion, wherein the fourth region has a fourth bandwidth greater than the third bandwidth.

20. The OFDM receiver of claim 19, wherein the OFDM engine is configured to determine the bandwidth of the OFDM complex valued sample stream by comparing the third attribute deviation with the fourth attribute deviation.

* * * * *